United States Patent
Wang et al.

(10) Patent No.: US 11,054,946 B2
(45) Date of Patent: Jul. 6, 2021

(54) IMAGE RECOGNITION DEVICE AND TOUCH PANEL

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Chihjen Cheng, Beijing (CN); Yanling Han, Beijing (CN); Ping Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/234,953

(22) Filed: Dec. 28, 2018

(65) Prior Publication Data
US 2019/0265839 A1 Aug. 29, 2019

(30) Foreign Application Priority Data
Feb. 23, 2018 (CN) .......................... 201820265645.1

(51) Int. Cl.
  G06F 3/042 (2006.01)
  G06T 7/593 (2017.01)
  H04N 13/282 (2018.01)
  H04N 13/239 (2018.01)
  H04N 13/00 (2018.01)

(52) U.S. Cl.
  CPC ............ *G06F 3/0421* (2013.01); *G06T 7/593* (2017.01); *H04N 13/239* (2018.05); *H04N 13/282* (2018.05); *G06T 2207/10028* (2013.01); *H04N 2013/0081* (2013.01)

(58) Field of Classification Search
  CPC .................. G06F 3/0421; G06T 7/593; G06T 2207/10028; H04N 13/239; H04N 13/282; H04N 2013/0081
  See application file for complete search history.

(56) References Cited

U.S. PATENT DOCUMENTS

| | | | | |
|---|---|---|---|---|
| 9,472,021 B2* | 10/2016 | Dai | .......................... | G06T 17/00 |
| 10,484,662 B2* | 11/2019 | Fattal | ................... | H04N 13/111 |
| 2010/0329358 A1* | 12/2010 | Zhang | .................. | H04N 19/187 |
| | | | | 375/240.26 |
| 2015/0254868 A1* | 9/2015 | Srikanth | ............ | H04N 5/23216 |
| | | | | 348/47 |
| 2016/0073080 A1* | 3/2016 | Wagner | ................ | H04N 13/239 |
| | | | | 348/47 |
| 2017/0140578 A1* | 5/2017 | Xiao | ..................... | G06T 3/4038 |

* cited by examiner

*Primary Examiner* — Kenneth B Lee, Jr.
(74) *Attorney, Agent, or Firm* — Dinsmore & Shohl LLP

(57) ABSTRACT

The present disclosure relates to image recognition devices and touch panels. An image recognition apparatus comprises a plurality of depth cameras including a plurality of depth camera units, each depth camera including two depth camera units, wherein the plurality of depth camera units is arranged in an array on a same substrate. According to the image recognition devices and touch panels of the embodiments, the accuracy of the depth detection can be improved.

18 Claims, 5 Drawing Sheets

IMAGE RECOGNITION DEVICE AND TOUCH PANEL

CROSS-REFERENCE TO THE RELATED APPLICATIONS

The present application claims priority to CN Application No. 201820265645.1 filed on Feb. 23, 2018, which is hereby incorporated in its entirety by reference.

TECHNICAL FIELD

The present disclosure relates to the field of electronic technologies, and in particular, to an image recognition apparatus and a touch panel.

BACKGROUND

With the development of 3D technology, the applications such as stereoscopic display, machine vision, satellite remote sensing, etc., more and more need to obtain the depth information of the scenes. Currently, depth cameras are able to capture depth information of targets within the camera's field of view (also abbreviated as field).

In the prior art, a depth camera of a binocular structure based on glass-based images sensor includes two glass-based depth camera units, and the glass-based image sensor includes a glass-based image sensor. Since the glass-based image sensor has a lower resolution, the accuracy of the depth detection by the depth camera based on a glass-based image sensor is inferior.

SUMMARY

The present disclosure is intended to alleviate or eliminate one of the technical problems in the related art.

An object of some embodiments of the present disclosure is to propose an image recognition apparatus to improve the accuracy of depth detection of depth camera based on glass-based image sensors.

Another object of some embodiments of the present disclosure is to propose a touch panel.

To achieve the above object(s), according to some embodiments of the first aspect of the present disclosure, an image recognition apparatus is provided that comprises: a plurality of array-arranged glass-based depth camera units and an image recognition processor; wherein the depth cameras are configured to form a plurality of local images of different depth ranges and different local field spaces; the image recognition processor is respectively connected to the plurality of glass-based depth camera units for performing depth image calculation on multiple ones of the local images, and mosaicing in a depth direction and a field direction.

According to the image recognition apparatuses of the embodiments of the present disclosure, a plurality of depth cameras is provided, and each depth camera forms a local image of a local field space rather than of the complete whole field space. Since the field angle of each depth camera is reduced, the accuracy of depth detection by the depth cameras is improved. The baseline distance between the two glass-based depth camera units of each depth camera is different, so that the scene which a respective depth camera is suitable to measure has a different depth of field, and a plurality of local images formed by a plurality of depth cameras can be merged in depth direction, therefore, the accuracy of depth detection can be further improved. And, by mosaicing a plurality of local images in field direction, the formation of the image of the complete field space can be ensured. In summary, the image recognition apparatus of the embodiments of the present disclosure can improve the depth detection accuracy for depth camera, and additionally can obtain the image of the complete field with improved accuracy.

In addition, the image recognition apparatus proposed by the foregoing embodiments of the present disclosure may further have the following additional technical features.

Optionally, in an embodiment of the present disclosure, the image recognition processor includes: a calculation sub-processor which is respectively connected to the plurality of glass-based depth camera units for performing a depth image calculation using a binocular depth detection algorithm on multiple ones of the local image, to obtain a plurality of local depth images.

Optionally, in an embodiment of the present disclosure, the image recognition processor further includes: a depth mosaic sub-processor connected to the calculation sub-processor, and configured to perform an extraction and mosaicing in depth direction on multiple ones of the local depth images, according to preset depth ranges of the respective depth cameras, to obtain a plurality of local longitudinal depth images.

Optionally, in an embodiment of the present disclosure, the image recognition processor further includes: a field mosaic sub-processor connected to the depth mosaic sub-processor for performing mosaicing in a direction of the field of view on multiple ones of the local longitudinal depth images.

According to a second aspect of the present disclosure, there is provided a touch panel which comprises in order from top to bottom: a prism film, an image recognition apparatus according to the embodiments of the first aspect of the present disclosure, a substrate, and a panel.

According to the touch panel of the present embodiment, a plurality of depth cameras is provided in the image recognition apparatus, and each depth camera forms a local image of a local field space rather than of the complete whole field space. Since the field angle of each depth camera is reduced, the accuracy of depth detection by the depth cameras is improved. The baseline distance between the two glass-based depth camera units of each depth camera is different, so that the scene which a respective depth camera is suitable to measure has a different depth of field, and a plurality of local images formed by a plurality of depth cameras can be merged in depth direction, therefore, the accuracy of depth detection can be further improved. And, by mosaicing a plurality of local images in field direction, the formation of the image of the complete field space can be ensured. In summary, the image recognition apparatus of the embodiments of the present disclosure can improve the depth detection accuracy for depth camera, and additionally can obtain the image of the whole field of view with improved accuracy. And, the image recognition apparatus is integrated together with the optical component layer, the substrate and the panel into the touch panel.

Optionally, in an embodiment of the present disclosure, the prism film is a single stand-alone lens, or a microlens array, or liquid crystal lenses.

Optionally, in an embodiment of the present disclosure, a focal length of the microlens is set to vary according to depth of field, and the farther the depth of field is, the larger the focal length is.

Optionally, in an embodiment of the present disclosure, the image recognition apparatus is disposed in a non-display area of the touch panel.

Optionally, in an embodiment of the present disclosure, the image recognition apparatus and other photosensitive unit-based photosensitive structures are disposed in the same layer over the substrate.

According to an aspect of the present disclosure, there is provided an image recognition apparatus comprising: a plurality of depth cameras including a plurality of depth camera units; wherein the plurality of depth camera units is arranged in an array on a same substrate.

In some embodiments, the plurality of depth cameras is configured to acquire a plurality of local images of different depth ranges and different local field spaces.

In some embodiments, the image recognition apparatus further comprises: an image recognition processor connected respectively to the plurality of depth camera units for performing depth image calculation on multiple ones of the local images, and mosaicing in a depth direction and a field direction.

In some embodiments, the image recognition processor comprises: a calculation sub-processor connected respectively to the plurality of depth camera units for performing depth image calculation on multiple ones of the local images by using a binocular depth detection algorithm to obtain a plurality of local depth images.

In some embodiments, the image recognition processor further comprises: a depth mosaic sub-processor connected to the calculation sub-processor for performing an extraction on the plurality of local depth images and mosaicing in the depth direction, according to at least preset depth ranges of the depth cameras, to obtain a plurality of local longitudinal depth images.

In some embodiments, the image recognition processor further comprises: a field mosaic sub-processor connected to the depth mosaic sub-processor for mosaicing the plurality of local longitudinal depth images in the field direction.

In some embodiments, the image recognition apparatus further comprises: the substrate, wherein the depth camera units comprise photosensitive elements formed on the substrate.

In some embodiments, the substrate is one of the following: a glass substrate, and a TFT substrate on which thin film transistors (TFTs) are formed.

In some embodiments, the plurality of depth cameras is divided into a plurality of groups, in each group at least two depth cameras share one depth camera unit, and the at least two depth cameras respectively have different distances between the two respective depth camera units thereof.

In some embodiments, the depth cameras are further configured to emit active light to illuminate an object scene and receive the light reflected from the object scene.

In some embodiments, the plurality of depth cameras comprises at least two depth cameras each including two depth camera units.

According to another aspect of the present disclosure, there is provided a touch panel comprising: a panel; a substrate on a side of the panel; the image recognition apparatus according to claim 1, disposed on a side of the substrate which is remote from the panel; and an optical component layer disposed on a side of the image recognition apparatus which is remote from the substrate.

In some embodiments, the optical component layer comprises one of the following: a single stand-alone lens, an array of microlenses, or liquid crystal lenses.

In some embodiments, focal lengths of the microlenses are set to vary based on depths of field of the respective depth cameras, and the farther the depth of field is, the larger the focal length of the respective micro-lens is.

In some embodiments, the image recognition apparatus is disposed in a non-display area of the touch panel.

In some embodiments, the touch panel further comprises: a photosensitive structure based on photosensitive unit, the photosensitive structure and the image recognition apparatus being disposed in a same layer on a side of the substrate which is away from the panel.

In some embodiments, the substrate is a TFT substrate on which thin film transistors (TFTs) are formed.

In some embodiments, the depth cameras are further configured to emit active light to illuminate an object scene and receive the light reflected from the object scene.

Additional aspects and advantages of the present disclosure will be set forth in part in the description as followed, and in part may become apparent from the following description, or be obtained from the practice of the present disclosure.

BRIEF DESCRIPTIONS OF DRAWINGS

The above and/or additional aspects and advantages of the present disclosure will become apparent and readily understood from the following description in conjunction with the drawings in which.

DESCRIPTIONS OF THE REFERENCE SIGNS

Figure 1:
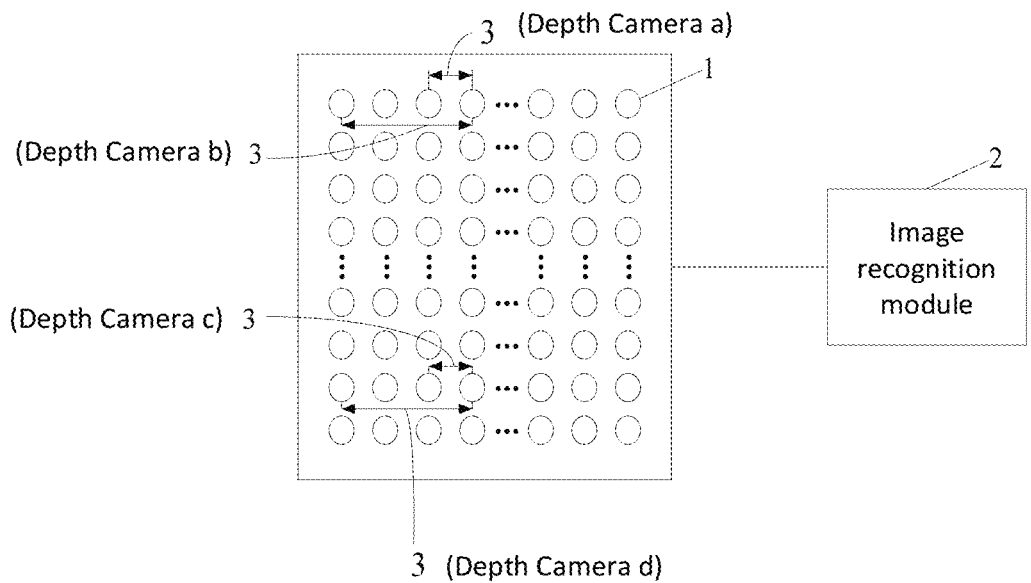
FIG. 1 is a schematic structural diagram of an image recognition apparatus according to an embodiment of the present disclosure.

1: Glass-based depth camera; 2: image recognition processor; 21: calculation sub-processor; 22: depth mosaic sub-processor; 23: field mosaic sub-processor; 3: depth camera; 4: prism film; 5: Image recognition apparatus; 6: substrate; 7: glass panel; 8: photosensitive unit; 9: other photosensitive structure.

DETAILED DESCRIPTION OF ILLUSTRATIVE EMBODIMENTS

The embodiments of the present disclosure are described in detail below, and the examples of the embodiments are illustrated in the accompanying drawings in which the same or similar reference numerals are used to indicate the same or similar elements or elements having the same or similar functions. The embodiments described below with reference to the accompanying drawings are intended to be illustrative, and are not to be construed as limiting.

Image recognition apparatuses and touch panels of embodiments of the present disclosure will be described below with reference to the drawings.

According to an aspect of the present disclosure, there is provided an image recognition apparatus comprising: a plurality of depth cameras including a plurality of depth camera units; wherein the plurality of depth cameras units is arranged in an array on a same substrate.

In an embodiment, the plurality of depth cameras is used to acquire a plurality of local images of different depth ranges and different local field spaces.

In an embodiment, the image recognition apparatus further comprises: an image recognition processor respectively connected to the plurality of depth camera units for performing depth image calculation on the plurality of local images, and mosaicing in a depth direction and in a direction of field of view (also termed as field direction).

In an embodiment, the image recognition apparatus further comprises the substrate, and the depth camera unit includes a photosensitive element formed on the substrate.

In an embodiment, the substrate is one of the following: a glass substrate, a TFT substrate on which thin film transistors (TFTs) are formed.

In an embodiment, the plurality of depth cameras comprises at least two depth cameras each including at least two depth camera units.

FIG. 1 is a schematic structural diagram of an image recognition apparatus according to an embodiment of the present disclosure. As shown in FIG. 1, the image recognition apparatus includes a plurality of glass-based depth camera units 1 arranged in array and an optional image recognition processor 2. For example, the plurality of depth cameras may comprise at least two depth cameras. The depth camera 3 includes two glass-based depth camera units 1. Although in this embodiment, a glass-based depth camera unit is taken as an example, it should be understood that the present disclosure is not limited thereto. It should also be understood that the term "glass based" is merely intended to indicate that the camera unit is formed based on a glass panel or a glass sheet, and does not exclude the presence of other components, layers, etc. between the photosensitive element of the camera unit and the glass panel or glass sheet. However, the present disclosure shall not be necessarily limited thereof, other panel or sheet can be likewise or adaptively applied. A plurality of depth cameras 3 are used to form a plurality of local images of different depth ranges and different local field spaces.

The image recognition processor 2 is connected respectively to a plurality of glass-based depth camera units 1 for performing depth image calculation on a plurality of local images, and mosaicing in a depth direction and a field direction.

Figure 2:
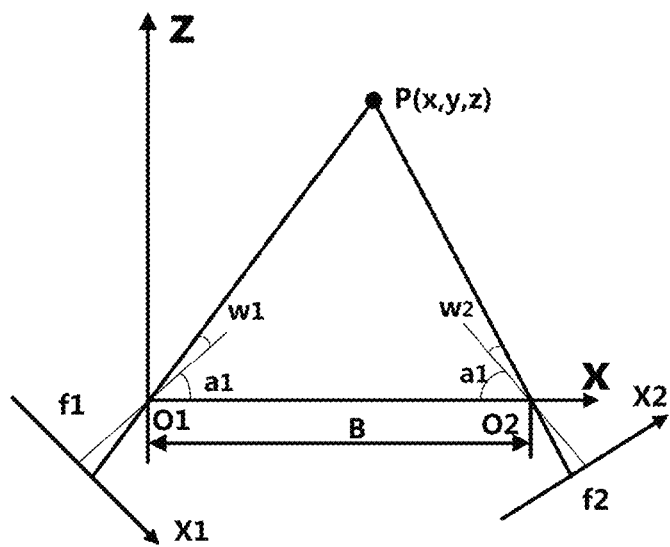
FIG. 2 is a schematic diagram of the basic principle of the binocular depth detection algorithm.

Specifically, depth cameras mainly have three architectures, namely: binocular stereo vision, time of flight (TOF) and structured light. Binocular stereo vision employs the stereo vision of two camera units to measure the depth of the scene using the binocular depth detection algorithm. In some implementations, the depth camera can receive light that is reflected by the three-dimensional scene and that can also be referred to as scene light. In other implementations, such as where depth measurement for a light with particular range of wavelengths (e.g., infrared light) is required, the depth camera can emit active light waves to illuminate the three-dimensional (3D) scene, and the light waves are reflected by the three-dimensional scene and returned to the depth camera. The depth information of the three-dimensional scene (for example, a 3D gesture) is acquired according to a time difference (i.e., a phase difference) between the emission time of the light wave and the reception time of the reflected light wave. The principle of binocular depth detection is as follows. FIG. 2 is a schematic diagram of the basic principle of the binocular depth detection algorithm. As shown in FIG. 2, a space object point P (x, y, z) is taken (shot) by two camera units which take O1 and O2 as the origin points respectively, and then matching points of the two taken images are obtained by image matching. Finally, the depth of the object point P is calculated by the trigonometry method. Following conclusions can be obtained from the derivation on the basic model of binocular depth detection.

1) The larger the focal lengths f1 and f2 of the two camera units are, the higher the accuracy of the depth measurement is.

Figure 3:
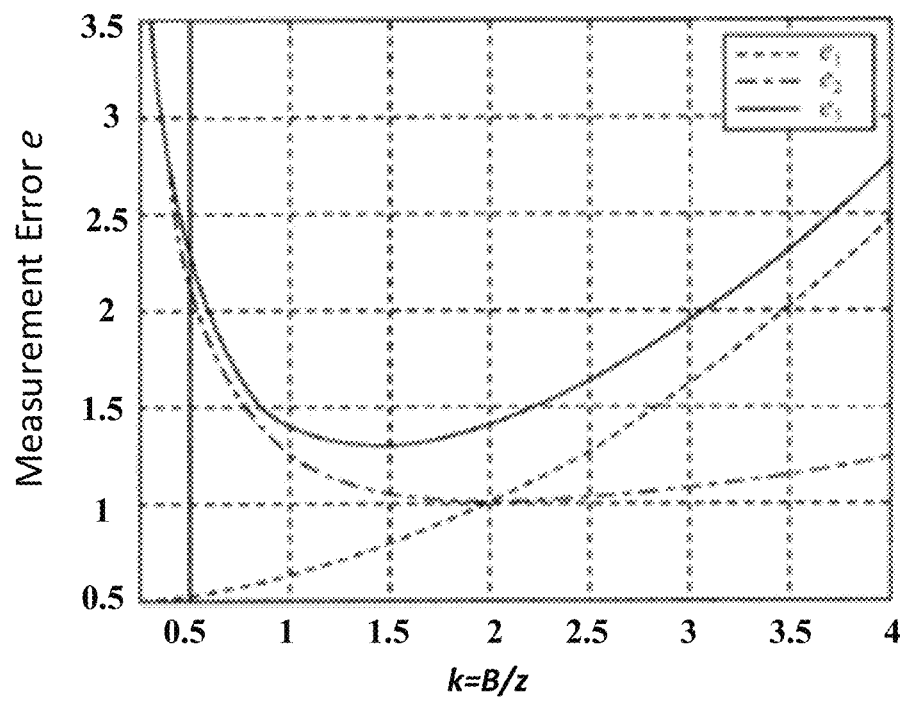
FIG. 3 is a schematic diagram showing a nonlinear relationship between the baseline distance B and the accuracy of the depth measurement.

2) The baseline distance B between the two camera units has a nonlinear relationship with the accuracy of the depth measurement. As shown in FIG. 3, when B/z<1, as the baseline distance B increases, the measurement error e gets smaller. That is, the accuracy of the depth measurement increases.

In actual design, the baseline distance B is often required to be small, which is advantageous for reducing the size of the components of the apparatus, but it will result in loss of accuracy of the depth measurement.

3) The accuracy of the depth measurement is positively correlated with the resolution of the image sensor in the camera unit. The higher the resolution is, the higher the accuracy of the depth measurement is.

It can be known from the above three conclusions that in the case glass-based image sensors are employed to realize a depth camera, the accuracy of the depth detection by the depth camera based on the glass-based image sensors may be poor due to the solution of the glass-based image sensors is low, and thus the performance thereof is poor. If however we try to increase the accuracy of the baseline distance B to boost the accuracy, it will increase the size of the components, making it hard or even impossible to productize.

As shown in FIG. 1, the image recognition apparatus according to an embodiment of the present disclosure is provided with a plurality of glass-based depth camera units 1 arranged in array. Two glass-based depth camera units 1 constitute a depth camera 3. Thereby, a plurality of depth cameras is provided. A configuration of four depth cameras 3 including depth camera a, depth camera b, depth camera c, and depth camera d is exemplarily shown in FIG. 1. The two closely distanced glass-based depth camera units 1 in the first row form a depth camera 3, i.e., the depth camera a. Two farther distanced glass-based depth camera units 1 in the first row form another depth camera 3, i.e., the depth camera b. In some embodiments, these two depth cameras 3 share a glass-based depth camera unit 1. In some embodiments, the physical distance between these two depth cameras 3 can be set relatively close. Since the baseline distance B between the two glass-based depth camera units 1 in one of these two is different from that of another, in order to improve the accuracy for a distant depth of field, we can use the depth camera b to extract image for the distant view, and the depth camera a to extract image for the nearby depth of field.

It should be understood that the combination of the depth cameras shown in FIG. 1 is only a possible implementation, and the embodiments of the present disclosure shall not be limited thereto. For example, it is also possible that the other two closely-distanced glass-based depth camera units 1 constitute a depth camera 3 as long as the principle can be used to improve the accuracy of the depth detection. In addition, for the depth camera 3 having a glass-based depth camera unit 1 which has the same performance as the glass-based depth camera units of the depth camera a and the depth camera b, the longer the baseline distance B is, the more suitable it is for the distant depth of field. Therefore, by continuously selecting a combination for depth camera 3 that the baseline distance B thereof is extended, we can cover any desired range of depth of field. Therefore, the plurality of depth cameras 3 in the present disclosure can form a plurality of local images of different depth ranges due to the difference in the baseline distances B thereof.

Figure 4:
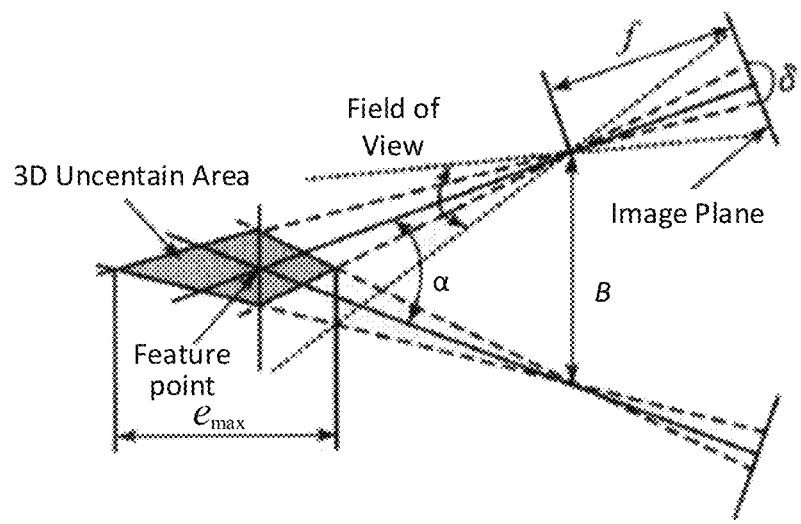
FIG. 4 is a schematic diagram showing the parameters for the principle of binocular depth detection.
Figure 5:
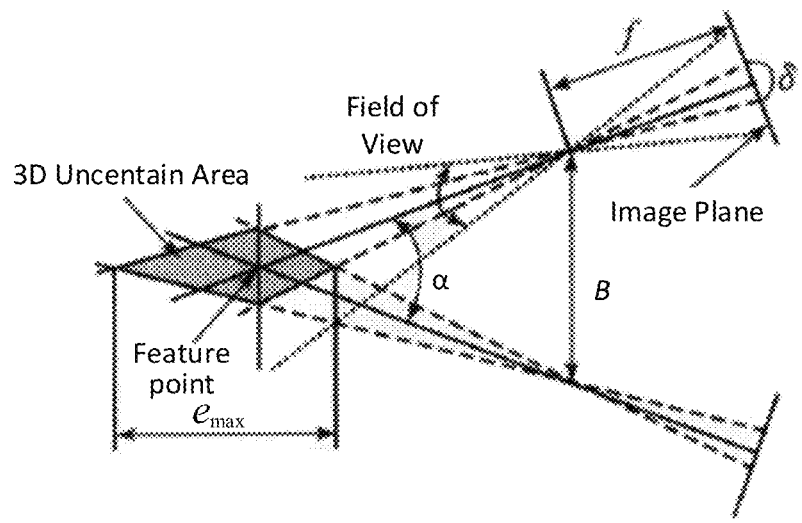
FIG. 5 is another schematic diagram showing the parameters for the principle of binocular depth detection.

In addition, in order to improve the accuracy of the depth detection of the single depth camera 3, the loss of accuracy can be compensated for by reducing the filed angle. FIG. 4 is a schematic diagram showing the parameters for the principle of binocular depth detection. As shown in FIG. 4, let the resolution of the image sensor is δ, the focal length is f, and the baseline distance is B, then the depth detection error is $e_{max}$. FIG. 5 is another schematic diagram showing the parameters for the principle of binocular depth detection. As shown in FIG. 5, if the resolution of the image sensor is adjusted to δ/2 at this time, in order to ensure that the depth detection error $e_{max}$ is constant, we may keep the baseline distance unchanged and still be B, but change the focal length to becomes f/2, then the field of view will be increased by 2 times. On the other hand, based on FIG. 5, if the resolution of the image sensor is adjusted to 2δ at this time, the size is unchanged, that is, the baseline distance is still B, and the depth detection error is still $e_{max}$, then the focal length may have to be raised to 2f; however, the consequence of the increasing in focal length is that the field is reduced into a half, and finally the field angle is reduced. Based on the above analysis, the depth cameras 3 of the present disclosure can form a plurality of local images of different local spaces of field by adjusting parameters and reducing the field angle. In practical applications, in order to ensure the formation of a complete field space image, a plurality of local images of different local field spaces formed by a plurality of depth cameras 3 may be mosaicked in the field direction. For example, in FIG. 1, the field spaces which are directed by the depth camera a and the depth camera b are adjacent, and the field spaces which are directed by the depth camera c and the depth camera d are adjacent; each of these cameras can only be responsible for the corresponding small field space. Thus, for the depth camera a, the depth camera b, the depth camera c, and the depth camera d, mosaicing in the field direction is performed to form an image of a larger field space.

After the imaging by the depth cameras 3, the local image formed by the depth cameras can be processed by an image recognition module. The image recognition module can be implemented by, for example, but not limited to, a processor or other circuitry. Therefore, in this specification, the image recognition module may also be referred to as an image recognition processor. In other embodiments, the image recognition module can also be implemented using hardware, software, firmware, or a combination thereof. The image recognition processor 2 is respectively connected to the plurality of glass-based depth camera units 1 for performing depth image calculation on a plurality of local images, and mosaicing in a depth direction and a field direction.

Figure 6:
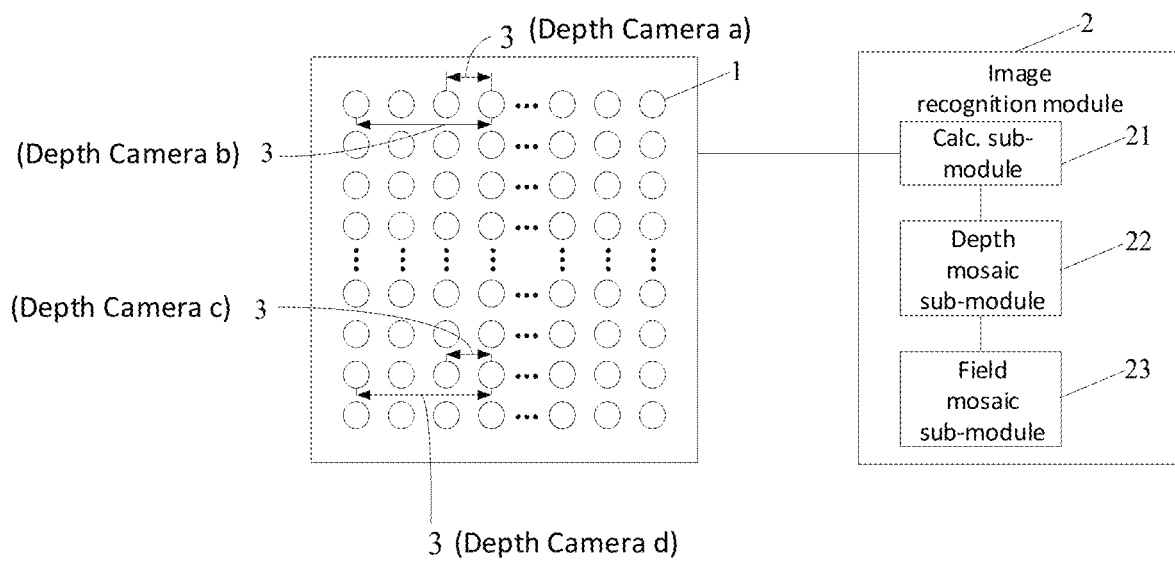
FIG. 6 is a schematic structural diagram of an image recognition apparatus according to another embodiment of the present disclosure.

FIG. 6 is a schematic structural diagram of an image recognition apparatus according to another embodiment of the present disclosure. As shown in FIG. 6, the image recognition processor 2 may specifically include a calculation sub-processor 21. In other embodiments, image recognition processor 2 may further include a depth stitching sub-processor 22 and a field stitching sub-processor 23.

The calculation sub-processor 21 is respectively connected to the plurality of glass-based depth camera units 1 for performing depth image calculation on a plurality of local images by using the binocular depth detection algorithm to obtain a plurality of local depth images. For details, please refer to the related contents in conjunction with FIG. 2 as above, and details are not repeatedly described here.

The depth mosaic sub-processor 22 is connected to the calculation sub-processor 21 for performing extraction on the plurality of local depth images obtained by the sub-processor 21 and mosaicing in the depth direction, according to a preset depth ranges corresponding to the plurality of depth cameras 3, to obtain a plurality of local longitudinal depth images.

Figure 7:
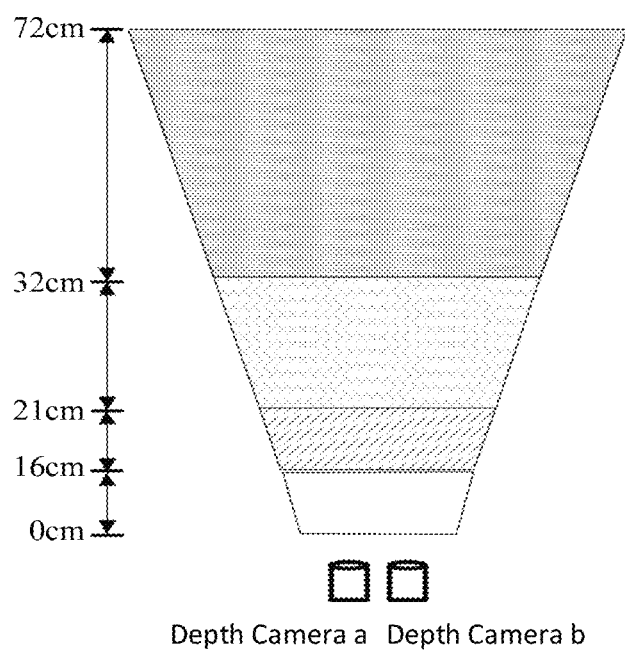
FIG. 7 is a schematic illustration showing such a case that a binocular depth camera provides a fixed depth of field.

FIG. 7 is a schematic illustration of a binocular depth camera providing a fixed depth of field. As shown in FIG. 7, taking two depth cameras 3 (i.e., the depth camera a and the depth camera b) in FIG. 1 perform mosaicing in the depth direction as example, based on the different baseline distances B of the depth camera a and the depth camera b, for the depth cameras 3 different preset depth ranges are set, that is, fixed depths of field are preset. For the depth camera a of which the baseline distance B is short, the preset depth range can be set to be close to the camera a. For the depth camera b of which the baseline distance B is large, the preset depth range can be set to be far from the camera b. In this way, a plurality of depth cameras 3 can cooperate to achieve a high-precision acquisition of depth information.

The field mosaic sub-processor 23 is connected to the depth mosaic sub-processor 22 for mosaicing the plurality of local longitudinal depth images obtained by the depth mosaic sub-processor 22 in the field direction.

Figure 8:
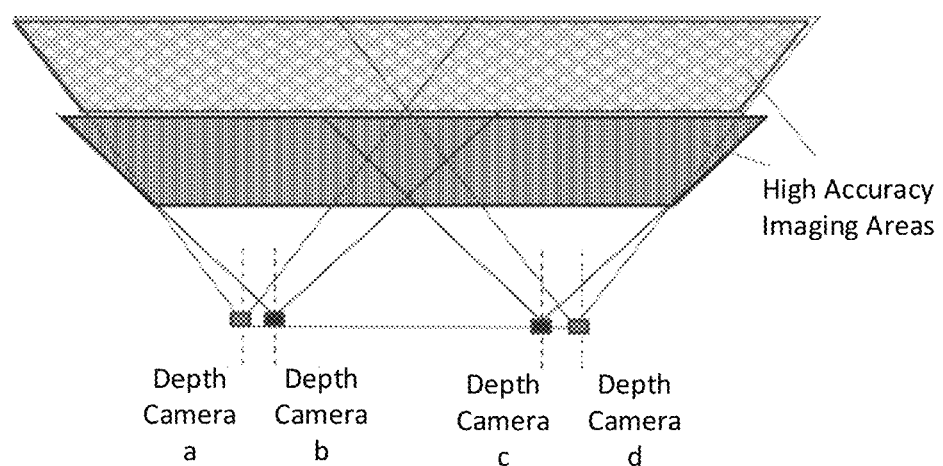
FIG. 8 is a schematic diagram of mosaic in a direction of field of view by a plurality of depth cameras.

FIG. 8 is a schematic diagram of mosaicing in the field direction for a plurality of depth cameras. In the example as shown in FIG. 8, mosaicing is performed in the field direction for the two depth cameras 3 (namely, the depth camera a and the depth camera b) and the other two depth cameras 3 (that is, the depth camera c and the depth camera d) in FIG. 1. In FIG. 1, the field spaces which are directed by the depth camera a and the depth camera b are adjacent, and the field spaces which are directed by the depth camera c and the depth camera d are adjacent; each of these cameras can only be responsible for the corresponding small field space. Thus, for the depth camera a, the depth camera b, the depth camera c, and the depth camera d, mosaicing in the field direction is performed to form an image of a larger field. In this way, a plurality of depth cameras 3 can cooperate to achieve the acquisition of the complete field spatial image.

In the embodiments, a plurality of depth cameras is provided, and each depth camera forms a local image of a local field space rather than of the complete whole field space. Since the field angle of each depth camera is reduced, the accuracy of depth detection by the depth cameras is improved. The baseline distance between the two glass-based depth camera units of each depth camera is different, so that the scene which a respective depth camera is suitable to measure has a different depth of field, and a plurality of local images formed by a plurality of depth cameras can be merged in depth direction, therefore, the accuracy of depth detection can be further improved. And, by mosaicing a plurality of local images in field direction, the formation of the image of the complete field space can be ensured. In summary, the image recognition apparatus of the embodiments of the present disclosure can improve the depth detection accuracy for depth camera, and additionally can obtain the image of the complete field with improved accuracy.

Figure 9:
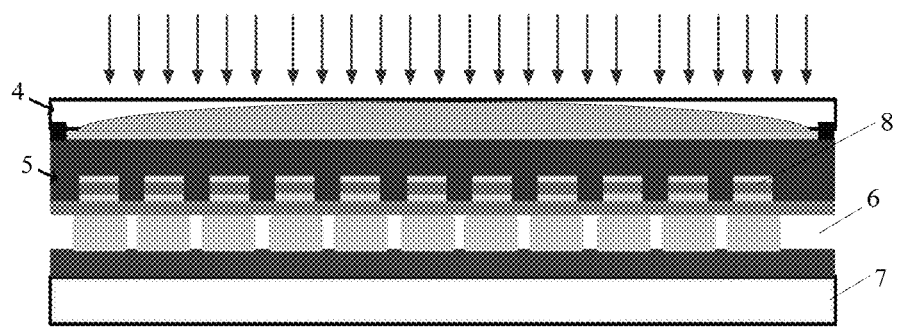
FIG. 9 is a schematic structural diagram of a touch panel according to an embodiment of the present disclosure.
Figure 10:
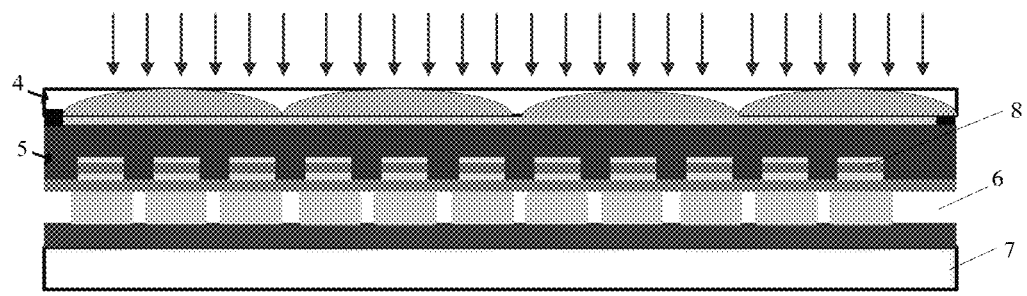
FIG. 10 is a schematic structural diagram of a touch panel according to another embodiment of the present disclosure.

Based on the above embodiments, the present disclosure also provides a touch panel. FIG. 9 is a schematic structural diagram of a touch panel according to an embodiment of the present disclosure. FIG. 10 is a schematic structural diagram of a touch panel according to another embodiment of the present disclosure. As shown in FIGS. 9 and 10, the touch panel includes an optical component layer (for example, a prism film) 4, an image recognition apparatus 5 of any of the above embodiments, a substrate 6, and a glass panel 7 which are disposed in order from the top to the bottom. Each glass-based depth camera unit in the image recognition apparatus 5 includes a plurality of photosensitive units 8. The photosensitive units 8 are disposed on the substrate 6, such as a Thin Film Transistor (TFT) substrate. The prism film 4 overlies on the photosensitive unit 8. The substrate 6 is disposed on the glass panel 7 such as BP Glass.

The optical component layer 4 may specifically be a single stand-alone lens (as shown in FIG. 9) or a microlens array (as shown in FIG. 10) or liquid crystal (LC) lenses. The optical component layer 4 can be any suitable optical component layer as long as it is capable of realizing an optical function for imaging. Since a lens can be viewed as a combination of a plurality of prisms in cross section, an optical component layer having a lens or a microlenses is also referred to as a prism film. However, it should be understood that the present disclosure is not limited thereto.

In the microlens array shown in FIG. 10, the focal lengths of the microlenses can be set to vary according to the depth of field as required, and the farther the depth of field is, the larger the focal length is. Since the space captured by the depth camera is a conical space, the farther the shooting distance is, the larger the spatial range is. In practical applications, when shooting at a long distance the accuracy of the depth detection can be improved by reducing the range of the field of view.

The image recognition apparatus 5 can be disposed in a non-display area of the touch panel, thus the display effect of the touch panel will not be influenced.

Figure 11:
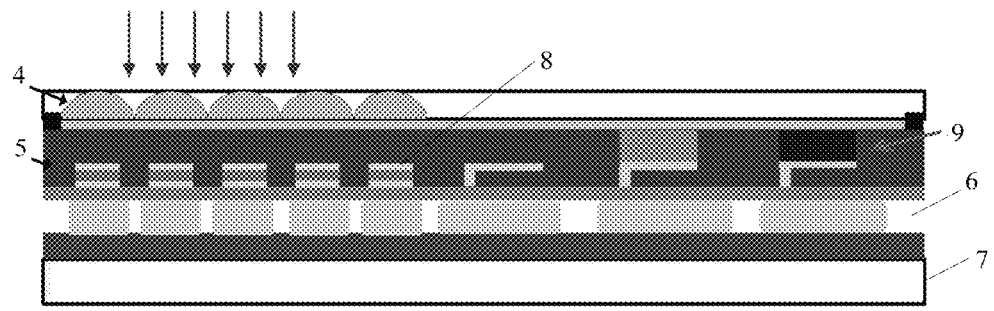
FIG. 11 is a schematic structural diagram of a touch panel according to a further embodiment of the present disclosure.

As shown in FIG. 11, on the basis of FIG. 10, the image recognition apparatus 5, and other photosensitive structures 9 based on the photosensitive units, such as a fingerprint sensor, an active matrix organic light emitting diode (AMO-LED) module, and the like, can be disposed in a same layer over the substrate 6 to increase the integration of the touch panel and increase the added value of the product.

According to the touch panel of the present embodiment, a plurality of depth cameras is provided in the image recognition apparatus, and each depth camera forms a local image of a local field space rather than of the complete whole field space. Since the field angle of each depth camera is reduced, the accuracy of depth detection by the depth cameras is improved. The baseline distance between the two glass-based depth camera units of each depth camera is different, so that the scene which a respective depth camera is suitable to measure has a different depth of field, and a plurality of local images formed by a plurality of depth cameras can be merged in depth direction, therefore, the accuracy of depth detection can be further improved. And, by mosaicing a plurality of local images in field direction, the formation of the image of the complete field space can be ensured. In summary, the image recognition apparatus of the embodiments of the present disclosure can improve the depth detection accuracy for depth camera, and additionally can obtain the image of the complete field with improved accuracy. And, the image recognition apparatus is integrated together with the optical component layer, the substrate and the glass panel into the touch panel.

In the description of the present specification, the description with reference to the terms "one embodiment", "some embodiments", "example", "specific example", or "some examples" and the like means the feature, structure, material, or characteristic described in connection with the embodiment(s) or example(s) is included in at least one embodiment or example of the present disclosure. In the present specification, the schematic descriptions in connection with the above terms are not necessarily directed to the same embodiment or example. Furthermore, the features, structures, materials, or characteristics described may be combined in a suitable manner in any one or more embodiments or examples. In addition, various embodiments or examples described in the specification, as well as features of various embodiments or examples, may be combined as appropriate.

Moreover, the terms such as "first" and "second" are used for descriptive purposes only, and shall not be construed as indicating or implying a relative priority or as implicitly indicating the number of technical features indicated. Thus, the features leaded by the terms such as "first" or "second" may indicate the existence of at least one such feature, either explicitly or implicitly. In the description of the present disclosure, the term "a plurality" means at least two, such as two, three, etc., unless specifically defined otherwise.

It will be readily understood by those skilled in the art to which the embodiments of the present disclosure pertain that any process or method description in flowcharts or otherwise described herein may be understood to represent one or more modules, segments or portions of code including executable instructions for implementing the steps of a custom logic function or process, and that the scope of the embodiments of the present disclosure includes additional implementations in which the functions may be performed in an order not shown or not discussed herein, including in a substantially simultaneous manner or in the reverse order depending on the functions involved.

The logic and/or steps presented in the flowchart or otherwise described herein may be considered as an ordered list of executable instructions, and may be embodied in any computer readable medium, to be used by or to be used in conjunction with an instruction execution system, apparatus, or device (e.g., a computer-based system, a system including a processor, or other system that can fetch and execute instructions from an instruction execution system, apparatus, or device). For the purposes of this specification, the term "computer-readable medium" as herein used may refer to any means that can contain, store, communicate, propagate, or transport program for use in an instruction execution system, apparatus, or device, or for use in conjunction with such an instruction execution system, apparatus, or device. More specific examples (as a non-exhaustive and non-enumerative list) of computer readable media may comprise: electrical connections (electronic devices) having one or more wires, portable computer disk cartridges (magnetic devices), random access memory (RAM), read only memory (ROM), erasable programmable read only memory (EPROM or flash memory), fiber optic devices, and portable compact disk read only memory (CDROM), or the like. In addition, the computer readable medium may even be a paper or other suitable medium on which the program can be printed, as it may be optically scanned, followed by editing, interpreting, or processing in other suitable manners as appropriate to electronically obtain the program and then store it in computer memory.

It should be understood that various components/portions of the embodiments of the present disclosure can be implemented in hardware, software, firmware, or a combination thereof. In the above-described embodiments, a plurality of steps or methods may be implemented in software or firmware stored in a memory and executed by a suitable instruction execution system. For example, if implemented in hardware as with in another embodiment, it can be implemented by any one of or any combination of the following techniques known in the art: discrete logic circuits with logic gates for implementing logic functions on data signals, application specific integrated circuits with suitable combinational logic gates, programmable gate arrays (PGAs), field programmable gate arrays (FPGAs), and the like.

A person skilled in the art will readily understand that all or part of the steps carried out by the method of the above embodiment can be completed by a hardware to which instructions can be given by a program which can be stored in a computer readable storage medium and which when being executed may implement one of or a combination of the steps of the method embodiments.

In addition, the functional elements/units in various embodiments of the present disclosure may be integrated into one processing module, or the elements/units may exist separately in physical, or two or more of the elements/units may be integrated into one module. The above integrated modules can be implemented in the form of hardware or in the form of software functional modules. Integrated modules can also be stored in a computer readable storage medium if they are implemented as software functional modules and sold or used as standalone products.

The storage medium as above mentioned may be a read only memory, a magnetic disk, an optical disk, or the like. While the embodiments of the present disclosure have been shown and described above, it is to be understood that the above-described embodiments are illustrative and are not to be construed as limiting the scope of the present disclosure. It is apparent for those skilled in the art that various variations, modifications, substitutions and changes can be made to the embodiments described herein without departing from the spirit and scope of the present disclosure.

What is claimed is:

1. An image recognition apparatus comprising:
   a plurality of depth cameras including a plurality of depth camera units, the plurality of depth camera units being arranged in an array on a same substrate,
   wherein the plurality of depth cameras comprises at least two depth cameras which are configured to acquire local images of different depth ranges and different local field spaces for mosaicing; and
   an image recognition processor connected respectively to the plurality of depth camera units for performing depth image calculation on multiple ones of the local images, and mosaicing in a depth direction and a field direction, wherein the image recognition processor comprises:
   a field mosaic sub-processor for mosaicing a plurality of local longitudinal depth images in the field direction,
   wherein a distance between two depth camera units of each depth camera of the at least two depth cameras is different, so that a scene which a respective depth camera of the at least two depth cameras is suitable to measure has a different depth of field,
   wherein the image recognition processor comprises:
   a calculation sub-processor connected respectively to the plurality of depth camera units for performing depth image calculation on multiple ones of the local images by using a binocular depth detection algorithm to obtain a plurality of local depth images.

2. The image recognition apparatus according to claim 1, wherein the image recognition processor further comprises:
   a depth mosaic sub-processor connected to the calculation sub-processor for performing an extraction on the plurality of local depth images and mosaicing in the depth direction, according to at least preset depth ranges of the depth cameras, to obtain a plurality of local longitudinal depth images.

3. The image recognition apparatus according to claim 1, further comprising:
   the substrate, wherein the depth camera units comprise photosensitive elements formed on the substrate.

4. The image recognition apparatus according to claim 3, wherein the substrate is one of:
   a glass substrate, or
   a TFT substrate on which thin film transistors (TFTs) are formed.

5. The image recognition apparatus according to claim 1, wherein:
   the plurality of depth cameras is divided into a plurality of groups,
   in each of the plurality of groups, at least two depth cameras share one depth camera unit, and
   the at least two depth cameras have different distances between respective two depth camera units thereof so that a scene which a respective depth camera of the at least two depth cameras is suitable to measure has a different depth of field.

6. The image recognition apparatus according to claim 1, wherein the depth cameras are further configured to emit active light to illuminate an object scene and receive the light reflected from the object scene.

7. The image recognition apparatus according to claim 1, wherein the plurality of depth cameras comprises at least two depth cameras each including two depth camera units.

8. A touch panel comprising:
   a panel;
   a substrate on a side of the panel;
   the image recognition apparatus according to claim 1, disposed on a side of the substrate which is remote from the panel; and
   an optical component layer disposed on a side of the image recognition apparatus which is remote from the substrate.

9. The touch panel of claim 8, wherein the optical component layer comprises one of:
   a single stand-alone lens, an array of microlenses, or liquid crystal lenses.

10. The touch panel according to claim 9, wherein focal lengths of the microlenses are set to vary based on depths of field of the respective depth cameras, and the farther the depth of field is for a respective depth camera, the larger the focal length of the respective micro-lens is.

11. The touch panel according to claim 8, wherein the image recognition apparatus is disposed in a non-display area of the touch panel.

12. The touch panel according to claim 8, further comprising:
    a photosensitive structure based on photosensitive unit, the photosensitive structure and the image recognition apparatus being disposed in a same layer on a side of the substrate which is away from the panel.

13. The touch panel according to claim 8, wherein the substrate is a TFT substrate on which thin film transistors (TFTs) are formed.

14. The touch panel according to claim 8, wherein the depth cameras are further configured to emit active light to illuminate an object scene and receive the light reflected from the object scene.

15. The touch panel according to claim 8, wherein the optical component layer comprises any one of:
    a single stand-alone lens,
    a microlens array, or
    liquid crystal (LC) lenses.

16. The touch panel according to claim 8, wherein the optical component layer comprises an array of microlenses, and
    wherein focal lengths of the microlenses are configured to vary according to depth of field as required, and configured such that the farther the depth of field is, the larger the focal length is.

17. The touch panel according to claim 8, further comprising:
    an other photosensitive structure disposed in a same layer as the image recognition apparatus at a side of the substrate which is remote from the panel.

18. The image recognition apparatus according to claim 2, wherein the field mosaic sub-processor is connected to the depth mosaic sub-processor for mosaicing the plurality of local longitudinal depth images in the field direction.

\* \* \* \* \*